C. A. HAAS.
PUMP FOR INFLATING RUBBER TIRES.
APPLICATION FILED JULY 24, 1909.
998,172.
Patented July 18, 1911.
2 SHEETS—SHEET 1.
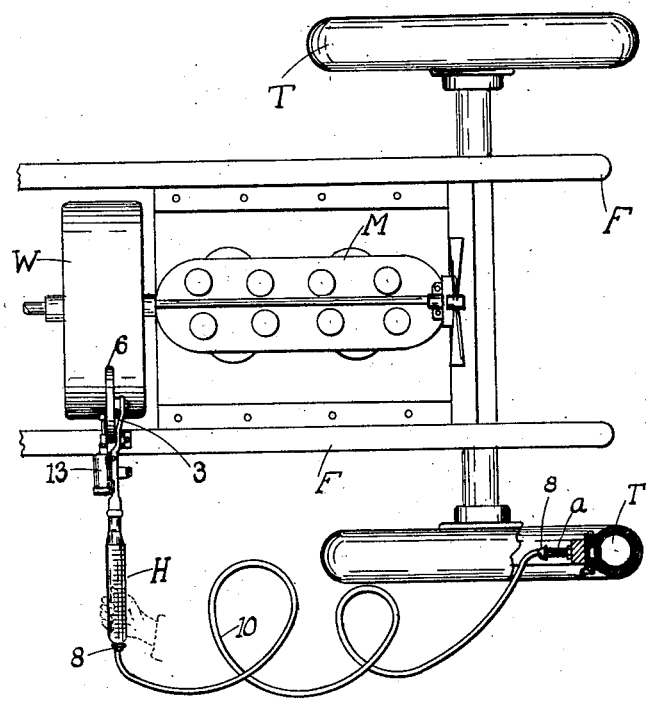
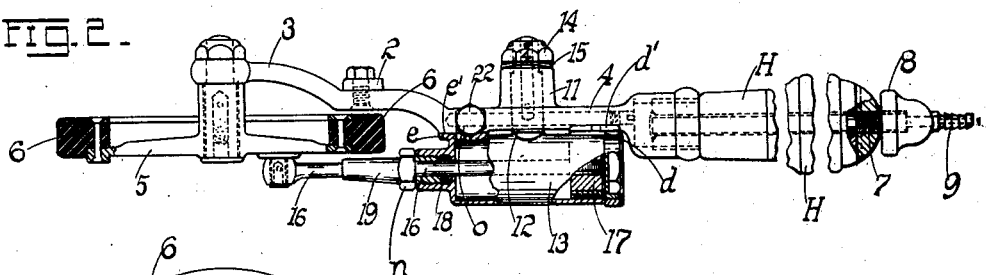
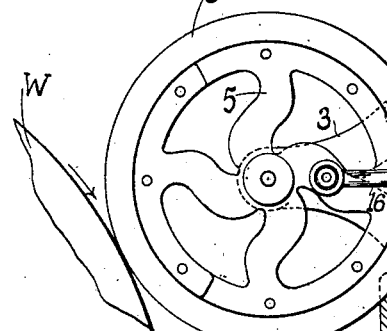
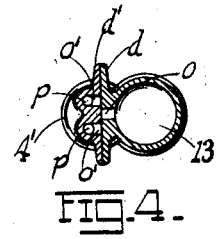
WITNESSES:
Harry A. Beimes
Fannie E. Weber
INVENTOR.
Cyrus A. Haas
BY
ATTORNEY.

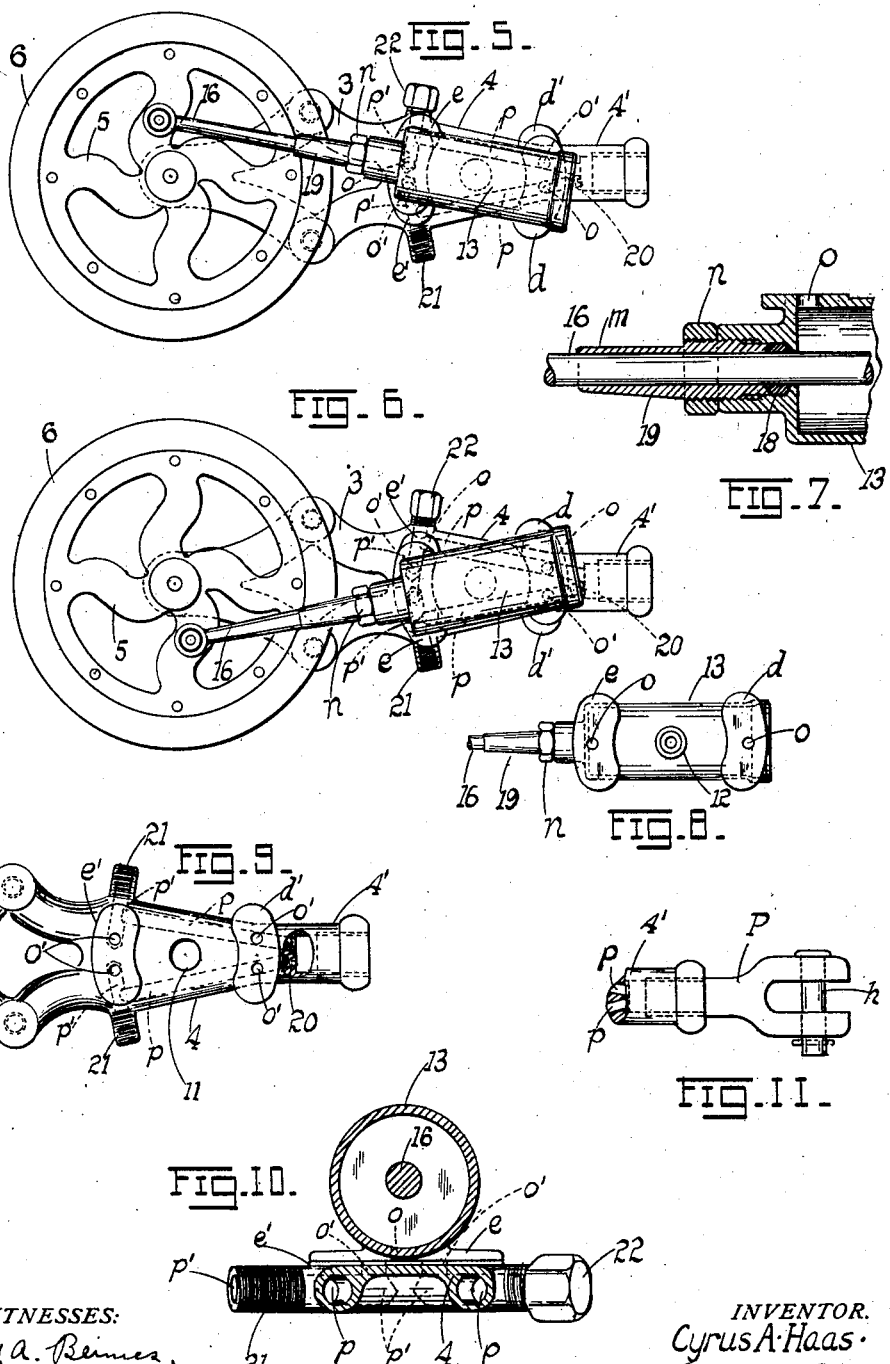

UNITED STATES PATENT OFFICE.

CYRUS A. HAAS, OF ST. LOUIS, MISSOURI.

PUMP FOR INFLATING RUBBER TIRES.

998,172.

Specification of Letters Patent. Patented July 18, 1911.

Application filed July 24, 1909. Serial No. 509,422.

*To all whom it may concern:*

Be it known that I, CYRUS A. HAAS, a citizen of the United States, residing at St. Louis, State of Missouri, have invented certain new and useful Improvements in Pumps for Inflating Rubber Tires, of which the following is a full, clear, and exact description, reference being had to the accompanying drawings, forming a part hereof.

My invention has relation to improvements in pumps for inflating rubber tires; and it consists in the novel construction of pump more fully set forth in the specification and pointed out in the claims.

In the drawings, Figure 1 is a top plan of an automobile frame showing the motor and fly-wheel with pump applied thereto; Fig. 2 is a detached top plan view of the pump with friction gear in section; Fig. 3 is a side elevation of the pump mounted on the automobile frame and with friction-gear in engagement with the motor fly-wheel; Fig. 4 is a cross-section on the curved line 4—4 of Fig. 3; Fig. 5 is a side elevation of the pump with handle removed showing the piston at half stroke in one direction; Fig. 6 is a similar view showing piston at half-stroke in the opposite direction; Fig. 7 is an enlarged longitudinal sectional detail of one end of the oscillating cylinder and piston rod and stuffing box therefor; Fig. 8 is a face view of the port side of the cylinder; Fig. 9 is a face view of the port side of the casing through which the compressed air is delivered to the hose coupled to the tire to be inflated; Fig. 10 is an enlarged cross section on the line 10—10 of Fig. 3; and Fig. 11 is a top plan of a modified form of one end of the casing receiving the compressed air from the pump cylinder.

The object of my invention is to provide an air pump which may be actuated by the fly-wheel of the motor of an automobile or other rotating part for the compression of air to be discharged into the inflatable section of the rubber tire of the wheel by which the body of the vehicle is supported. Such a pump will necessarily dispense with the necessity of hand pumping, so that the work of the chauffeur will be materially reduced.

A further object is to construct a pump which will be double acting, one dispensing with check-valves and valve ports so that there is no material loss in pressure due to friction and the actuation of valves, thereby permitting a very high speed; one in which the compressed air takes a most direct route to the point of destination, one composed of a minimum number of parts, one which is cheap, simple, durable and reliable; one under ready control of the operator, one which can be actuated by a fly-wheel rotating in either direction, one which is quick-acting and requiring a minimum amount of power for its actuation; and one possessing further and other advantages better apparent from a detailed description of the invention which is as follows:—

Referring to the drawings, M represents the driving motor, W the fly-wheel, F the frame supporting the motor, and T the inflated tires of the wheels of the automobile. These features are shown more or less conventionally as they are well understood in the art and form no part of the present invention. Preferably (though not necessarily) bolted to the frame member F opposite the periphery of the fly-wheel is a socket 1 for the reception of a block 2 pivotally suspended from, or attached to, the bent skeleton arm 3 forming the outer terminal of the pump casing or cylinder-support 4, the free end of the arm carrying the friction-wheel or sheave 5 the rim of which carries a yielding rubber, aluminum or other friction band 6 which is pressed directly against the periphery of the fly-wheel W when the pump is to be set in operation. The cross-section of the casing 4 is shown to best advantage in Fig. 10 a large bulk of the metal being removed from between the sides to make the casting or drop forging as light as possible. The sides of the casing converge rearwardly terminating in a socket 4' into which may be screwed a hollow handle H as shown in Figs. 1 and 2, or a forked plug P as shown in the modification in Fig. 11. Where a hollow handle is employed a small tube 7 is screwed into the outer end thereof and left to project beyond the handle, such projecting end receiving a socket 8 over the terminal stem 9 of which is slipped one end of the hose 10, the opposite end of the hose being coupled to the casing *a* of the check-valve carried by the inflatable portion of the tire T. The check-valve is not described herein as the same forms the subject-matter of a separate application; besides, any available check-valve might be employed with the present pump.

Formed on the outer face of the casing 4 near the center is a hollow boss 11 which receives the hollow stud or spindle 12 of the oscillating cylinder 13, the spindle 12 being secured to the boss 11 by means of a nut 14 passed over the reduced screw-threaded end of the spindle and bearing against a bent washer 15 conforming in curvature to a cylindrical surface, the washer being interposed between the nut and the end of the boss (Fig. 2). The piston-rod 16, leading from the piston 17 of the cylinder passes through a stuffing-box 18 at one end of the cylinder, the gland or follower 19 of the said stuffing box having a flattened portion $m$ to afford a better grip thereof by a wrench or other tool by which the gland is to be adjusted. The gland serves as a bearing for the piston-rod and by first loosening the jam-nut $n$, the gland may be properly adjusted as obvious from Fig. 7; and when adjusted and the nut locked, the axes of the bearing and of the piston-rod and cylinder are in perfect alinement. The outer end of the piston-rod is pivotally coupled to the adjacent face of the friction wheel 5 at a suitable distance from the axis of rotation thereof, so that as the wheel 5 rotates it will not only impart a reciprocating motion to the piston, but will necessarily oscillate the cylinder 13 about the axis of the spindle 12.

Disposed in the pump-casing or cylinder-support 4 adjacent to its converging sides are passage-ways $p$, $p$, the converging ends of one or both of which may be closed by screw-plugs 20 (one or both being closed according to circumstances as presently to be seen). The diverging ends of said passage-ways terminate in legs or extensions $p'$ $p'$ whose outer terminals open through the screw-nipples 21, their inner ends being spaced a suitable distance apart and opening into the ports $o'$ $o'$. A similar pair of ports $o'$, $o'$ lead from the passage-ways near their converging ends (Fig. 9). The last set of ports are disposed on either side of the center of a flat wearing surface or formation $d'$, the first set being disposed similarly on the rubbing surface or formation $e'$. These formations $d'$, $e'$ form the rubbing faces for a similar set of faces or formations $d$, $e$ disposed on the cylinder 13 on opposite sides of the spindle 12 (Fig. 8), the formations $d$, $e$ on the other hand being provided with ports $o$, $o$ at the centers of the respective formations, so that when the formations $d$, $e$ on the cylinder are superposed directly over the formations $d'$, $e'$ of the cylinder-support 4 (Figs. 3, 4) for the end of either stroke of the piston or for that position of the cylinder where its axis is parallel to the axis of the casting 4, the ports $o$, $o$ of the cylinder will be between the ports $o'$, $o'$ of the cylinder-support 4, and there will be no communication between them. Intercommunication between the ports $o$, $o'$, at either end of the cylinder is thus only possible when the cylinder has been oscillated to one of its extreme positions (Figs. 5, 6) or at the end of the first and third quarter rotation of the wheel 5, the second and fourth quarters bringing the piston rod into parallelism with the cylinder axis, and hence causing the cylinder to assume the position shown in Fig. 3 (said figure showing the piston rod at the end of the last quarter revolution of the wheel 5). The contacting or rubbing faces $d$, $e$, $d'$, $e'$, naturally bring their respective ports $o$, $o'$, $o'$, close together and hence check-valves and the like are dispensed with.

The operation will now be apparent from the previous description and is as follows:— Let us assume that the fly-wheel W is rotating in the direction shown by the arrow in Fig. 3. The operator then inserts the block 2 into the socket 1 and with his hand (Fig. 1) he rocks the handle H so as to forcibly press the band 6 of the wheel 5 against the rapidly rotating fly-wheel. The wheel 5 will then rotate as shown by the arrow in Fig. 3 carrying the piston rod with it and oscillating the cylinder 13 about its transverse axis first up and then down as shown in Figs. 5 and 6. When the wheel as shown in Figs. 5 and 6. When the wheel 5 has made a quarter turn (Fig. 5) the ports $o$, $o$ at opposite ends of the cylinder are then superposed over the diagonally opposite ports $o'$, $o'$ of the respective pairs of ports $o'$, $o'$, $o'$, $o'$, of the casting 4, the piston traveling from right to left and driving the air before it through the registering ports $o$, $o'$, at the left hand end of the cylinder into the upper leg $p'$ and passage-way $p$ of the casting 4, into the hollow handle H, hose 10, and into the tire T. By the time the wheel 5 has ended the third quarter of its rotation (Fig. 6) the cylinder will have been rocked in the opposite direction, the ports $o$, $o$ thereof have been superposed over the remaining diagonally opposite ports $o'$, $o'$ of the pairs $o'$, $o'$, $o'$, $o'$, the piston now traveling from left to right and driving the air before it through the registering ports $o$, $o'$ at the right hand end of the cylinder, into the handle H and so on to the tire T. Of course one of the nipples 21 must be closed by a screw-cap 22, the cap being on the nipple which is identified with the passage-way $p'$ $p$, into which the air is driven on its way to the tire with either stroke of the piston. With the wheels W and 5 rotating in the direction illustrated (Fig. 3), the upper nipple 21 will be closed and the lower nipple left uncovered since the open nipple serves as the intake end for the air which is subsequently expelled with a stroke of the piston in the opposite direction. In Fig. 5 for example the air will enter the open nipple, thence pass through the passage-way $p'$ to the right hand end of the passage $p$ where the screw-plug 20 arrests it, compelling the air to flow through the registering ports $o$, $o'$ at the right hand end of the cylinder, into the cylinder behind the piston. In Fig. 6 on the other hand, the air enters through the open nipple 21 into the left hand passage or leg $p'$, thence at once flows through the registering ports $o$, $o'$, at the left hand end of the cylinder, directly behind the piston which is now traveling from left to right expelling the air before it as already described. The plug 20 thus compels the air to flow into the cylinder behind the piston, while the cap 22 prevents the air forced by the piston, from escaping into the atmosphere, constraining it to flow into the handle H as described. If, however, the fly-wheel happens to be rotating in the opposite direction from that shown in Fig. 3, so as to reverse the rotation of the wheel 5, then it would follow that the expulsion of the air from the cylinder would take place from the left hand end while the cylinder was being oscillated with its left end downward (Fig. 6). In that event we would put the cap 22 on the lower nipple 21 using the upper nipple for the intake. At the same time we would remove the plug 20 from the lower passage $p$ and plug up the end of the upper passage. The operator can always adjust the screw-cap 22 and plug 20 knowing the direction the fly-wheel of his motor is turning preparatory to his pumping or inflating a tire.

When not in use the wheel 5 with its supporting arm 3 may be swung out of engagement with the wheel W, the block 2 remaining permanently in the socket 1 of the motor-frame if desirable.

It will be seen by an inspection of Fig. 2, that the tighter we drive the nut 14 against the cylindrically bent washer 15, the tighter will we draw together the rubbing faces $d$, $d'$, $e$, $e'$, of the cylinder 13 and cylinder-support 4 respectively, and lessen liability of leakage of the compressed air passing through the ports $o$, $o'$. In the course of inflation of a tire, of course, no perceptible leakage or blow-off of the air takes place from between the rubbing faces referred to, but when a tire is fully inflated the excess of air expelled by the pump will now blow off or leak out from between the faces. Since a three inch tire for example has less power of resistance than a four inch (being lighter) the nut 14 must be set at a tension to correspond to such three inch tire. For a four-inch tire the nut 14 is tightened so as to increase the intensity of contact between the respective rubbing faces thus increasing the resistance to the final blow-off of the air when such tire is fully inflated. In other words, the lighter the tire the less should be the pressure on the washer 15 so that the blow-off may take place at a pressure corresponding to the resisting capacity of any given tire. To enable the nut 14 to be properly set for any given tire, the sides of the nut are graduated or marked with numbers 3, 4, etc., corresponding to the cross-sectional diameter of the tire in inches (the number "4" appearing in the illustration in Fig. 2) and when any given number appears at the "top" of the nut we know that the same has been screwed down sufficiently for a particular tire. When set, the nut may be locked by a cotter or pin (not shown), inserted through registering openings formed in the nut and screw-threaded portion of the hollow spindle 12. No importance however, is attached to this method of locking the nut as it is well understood in the art. The cavity in the spindle 12 serves for the introduction of oil, an oil hole at the bottom thereof conducting the oil between the inner surface of the hub or boss 11 and the spindle 12. This however, is also well understood in the art.

Having described my invention, what I claim is:—

1. In combination with a rotatable member, a pump-cylinder oscillating about a fixed axis disposed parallel to the axis of the rotatable member, and provided with a reciprocating piston, a piston-rod leading toward the rotatable member from the piston, a pivoted cylinder-support provided with suitable intake and discharge passageways establishing intercommunication between the interior of the cylinder and said passage-ways, a wheel on the support rotatable about a fixed center and having one face thereof coupled to the outer end of the piston-rod, the periphery of said wheel engaging the periphery of the rotatable member under a positive thrust exerted against the rotatable member through the wheel aforesaid, and means for connecting the wheel to the support from the side opposite the piston rod whereby the center line of said thrust will be brought in the plane passing through the center of the wheel and at right angles to the axis of rotation thereof, and a terminal member on the cylinder-support disposed in the line of thrust aforesaid, through which the thrust is exerted.

2. In combination with a closed pump-cylinder oscillating about a fixed axis and provided with a reciprocating piston, a piston-rod leading in one direction from the piston through one end of the cylinder, a cylinder-support having intercommunicating intake and discharge passage-ways disposed symmetrically on opposite sides of the axis of the support and of the axis of oscillation of the cylinder, and converging toward the axis of the support, a wheel on the support rotatable about a center disposed on the axis of the support and coupled to the outer end of the piston-rod, formations opposite the convergence of the respective passage-ways on the support, and on the cylinder respectively, affording rubbing faces, the formations being provided with ports positioned to afford intercommunication between the interior of the cylinder and the passage-ways, means for closing the outer end of one of the intake passage-ways, and a hollow handle coupled to the support for conducting the expelled fluid to a suitable point of consumption.

3. In combination with a closed pump-cylinder oscillating about a fixed axis and provided with a reciprocating piston, a piston-rod leading in one direction from the piston through one end of the cylinder, a cylinder support provided with suitable intake and discharge passage-ways, means on the cylinder and support respectively for establishing intercommunication between the interior of the cylinder and said passage-ways, a wheel on the support rotatable about a center disposed on the axis of the support and coupled to the outer end of the piston-rod, and a hollow handle coupled to the support at the end opposite the wheel for conducting away the expelled fluid, the longitudinal center of the handle being on the line of the axis of the support, and in the central plane of rotation of the wheel.

4. An air-pump for inflating automobile rubber tires, comprising a rotatable wheel adapted to be frictionally geared to the fly-wheel of the motor, a supporting arm for the wheel, a cylinder-support coupled to the arm, a cylinder mounted to oscillate in the support about a central transverse axis, a piston and piston-rod for the cylinder, the outer end of the rod being coupled to the wheel, a socket formed on the cylinder-support, a hollow-handle coupled to the socket and provided with a hose extension leading to the tire, the cylinder and cylinder-support being provided with suitable ports and passage-ways for drawing in, and expelling the air from, the cylinder into the hollow handle and hose and into the tire, with each stroke of the piston.

In testimony whereof I affix my signature, in presence of two witnesses.

CYRUS A. HAAS.

Witnesses:
EMIL STAREK,
FANNIE E. WEBER.

---

Copies of this patent may be obtained for five cents each, by addressing the "Commissioner of Patents, Washington, D. C."